(12) United States Patent
Boutaghou et al.

(10) Patent No.: US 6,198,606 B1
(45) Date of Patent: Mar. 6, 2001

(54) DISC DRIVE ACTUATION SYSTEM HAVING AN INJECTION MOLDED MAGNETIC MICRO-ACTUATOR WITH METAL BEAM INSERTS AND ITS METHOD OF FABRICATION

(75) Inventors: Zine-Eddine Boutaghou, Vadnais Height; Wayne Allen Bonin, North Oaks; Peter Crane, South Richfield, all of MN (US)

(73) Assignee: Seagate Technology LLC, Bloomington, MN (US)

( * ) Notice: Subject to any disclaimer, the term of this patent is extended or adjusted under 35 U.S.C. 154(b) by 0 days.

(21) Appl. No.: 09/539,444

(22) Filed: Mar. 30, 2000

Related U.S. Application Data
(60) Provisional application No. 60/146,228, filed on Jul. 28, 1999.

(51) Int. Cl.$^7$ .................................................... G11B 5/55
(52) U.S. Cl. ........................................................ 360/294.3
(58) Field of Search .............................. 360/234.4–234.6, 360/290, 294–294.7

(56) References Cited

U.S. PATENT DOCUMENTS

| | | | |
|---|---|---|---|
| 5,165,090 | 11/1992 | Takahashi | 369/215 |
| 5,621,590 | 4/1997 | Pace | 360/106 |
| 5,781,380 | 7/1998 | Berding | 360/104 |
| 5,828,521 | 10/1998 | Hasegawa | 360/104 |
| 5,894,382 | 4/1999 | Hyde | 360/106 |
| 5,936,805 | 8/1999 | Imaino | 360/104 |
| 5,959,808 * | 9/1999 | Fan et al. | 360/106 |
| 5,995,334 * | 11/1999 | Fan et al. | 360/106 |
| 6,067,215 * | 5/2000 | Zhang | 360/260 |
| 6,078,471 * | 6/2000 | Fiske | 360/104 |
| 6,078,473 * | 6/2000 | Crane et al. | 360/104 |
| 6,078,476 * | 6/2000 | Magee et al. | 360/106 |
| 6,097,575 * | 8/2000 | Trang et al. | 360/234.4 |

* cited by examiner

*Primary Examiner*—Jefferson Evans
(74) *Attorney, Agent, or Firm*—Lariviere, Grubman & Payne, LLP

(57) ABSTRACT

A method of fabricating a disc drive actuation system having a head level magnetic micro-actuation assembly utilizing flexible beam inserts and the disc drive actuation system thereby produced are provided. The method comprises the steps of: (a) forming a mold with a first cavity for a micro-actuator body and a second cavity for a slider body; (b) placing a plurality of magnets in a magnet keeper; (c) placing the magnet keeper in the second cavity of the mold; (d) etching a flexible beam insert from a flexible material such as sheet stainless steel; (e) placing the flexible beam insert into the mold, (f) filling the mold with a fluid; (g) solidifying the fluid to form the micro-actuator body and the slider body; (h) removing the micro-actuator body and slider body from the mold; and (i) inserting a slider into the slider body, thereby forming the magnetic micro-actuator assembly; and (j) installing the magnetic micro-actuator assembly into a disc drive assembly, and thereby producing the disc drive actuation system having a head level magnetic micro-actuator assembly utilizing flexible beam inserts. This fabrication process involves a single injection-molding step, a tremendous cost and fabrication advantage over conventional MEMS processing. The resultant disc drive actuation system has a magnetic micro-actuator assembly which is an injection-molded micro-actuator body and an injection-molded slider body, having flexible beams metal inserts extending from the micro-actuator body to the slider body. The slider body supports a slider with a transducing head. The micro-actuator body acts as a stator of a motor and the slider body acts as a rotor of a motor. The flexible beams allow movement between the micro-actuator body and the slider body. The movement of the slider body allows for a finer movement of the transducing head over a disc seated in a disc drive.

20 Claims, 7 Drawing Sheets

DISC DRIVE ACTUATION SYSTEM HAVING AN INJECTION MOLDED MAGNETIC MICRO-ACTUATOR WITH METAL BEAM INSERTS AND ITS METHOD OF FABRICATION

CROSS-REFERENCE TO RELATED APPLICATION(S)

This application claims priority from Provisional Application Ser. No. 60/146,228, filed Jul. 28, 1999, for "Injection Molded MAGMA With Metal Beam Inserts" by Z. Boutaghou, W. Bonin, and P. Crane.

TECHNICAL FIELD

The present invention relates to disc drive micro-actuators. Even more particularly, the present invention relates to injection-molded disc drive micro-actuators having metal inserts and etched substrates.

BACKGROUND OF THE INVENTION

With the increasing density of information stored on magnetic discs, there is a need for more precise head positioning. Related art disc drive actuation systems using electrostatic micro-actuators do not provide sufficient actuation force to this end. In U.S. patent application Ser. No. 09/315,006, filed May 16, 1999, for "Magnetic Micro-Actuator" by P. Crane, W. Bonin, and B. Zhang, herein incorporated by reference, a magnetic micro-actuator is disclosed which is used in a dual-stage actuation assembly. A voice coil motor provides gross movement in a first stage and a magnetic micro-actuator provides fine movement in a second stage. The micro-actuator assembly uses a high strength wafer substrate material such as molybdenum or cold-rolled titanium. Alternatively, the micro-actuator assembly may also utilize a conventional wafer substrate material such as silicon. Such substrate materials would need to be etched. Problems associated with magnetic micro-actuator fabrication arise from high machining cost, inherent fragility of a silicon substrate as demonstrated during micro-electro-mechanical system (MEMS) fabrication and upon exposure to shock, platting of the "stand-offs," and de-lamination of the magnet assembly from the silicon substrate. Thus, the cost-effective manufacturing, via injection-molding, of a disc drive actuation system using a durable head level magnetic micro-actuator, having flexible beam inserts etched from an inexpensive substrate, is desirable.

BRIEF SUMMARY OF THE INVENTION

The object of the present invention is to provide a cost-effective method of fabricating a head level magnetic micro-actuator assembly, having flexible beam inserts etched from an inexpensive substrate, utilized in a disc drive actuation system for reading from and writing to a disc and a system thereby formed. Accordingly, this objective is accomplished by fabrication of a magnetic micro-actuator assembly by a process comprising the steps of: (a) forming a mold with a first cavity for a micro-actuator body and a second cavity for a slider body; (b) placing a plurality of magnets in a magnet keeper; (c) placing the magnet keeper in the second cavity of the mold; (d) etching a flexible beam insert from a flexible material such as sheet stainless steel; (e) placing the flexible beam insert into the mold; (f) filling the mold with a fluid; (g) solidifying the fluid to form the micro-actuator body and the slider body; (h) removing the micro-actuator body and slider body from the mold; and (i) inserting a slider into the slider body.

Subsequently, the magnetic micro-actuator assembly is installed into a disc drive assembly, wherein a voice coil is mounted to an end of an actuator arm, wherein the actuator arm is mounted on a spindle for rotating about an axis, wherein a head suspension is connected to an opposite end of the actuator arm at a head mounting block, wherein a flexure is mounted at one end of the head suspension away from the actuator arm, wherein the flexure carries the magnetic micro-actuator assembly for providing the requisite resolution and frequency response for precisely positioning a transducing head over a selected track of a disc, and thereby producing a disc drive actuation system having a magnetic micro-actuator using flexible beam inserts.

In addition, substrate fragility is no longer an issue as the present invention uses a flexible beam insert in contrast to related art apparati which use brittle silicon inserts. The fabrication process of the present invention involves a single injection-molding step, a tremendous cost and fabrication advantage over the related art process involving several MEMS steps. Further, a plurality of stand-offs for receiving a ferromagnetic keeper and a gimbal assembly may be added during the injection-molding step without adding cost.

The resultant micro-actuation system is an injection-molded micro-actuator body and an injection-molded slider body, with flexible beams metal inserts extending from the micro-actuator body to the slider body. The slider body supports a slider with a transducing head. The micro-actuator body acts as a stator of a motor and the slider body acts as a rotor of a motor. The flexible beams allow movement between the micro-actuator body and the slider body. The movement of the slider body allows for a fine movement control of the transducing head over a disc seated in a disc drive. Thus, a cost-effective method of fabricating a disc drive actuation system having a magnetic micro-actuator using flexible beam inserts and a disc drive system thereby formed are provided by the present invention.

Other features of the present invention are disclosed or apparent in the section entitled: "DETAILED DESCRIPTION OF THE INVENTION."

BRIEF DESCRIPTION OF THE DRAWINGS

For a fuller understanding of the present invention, the accompanying drawings are below referenced.

Figure 1:
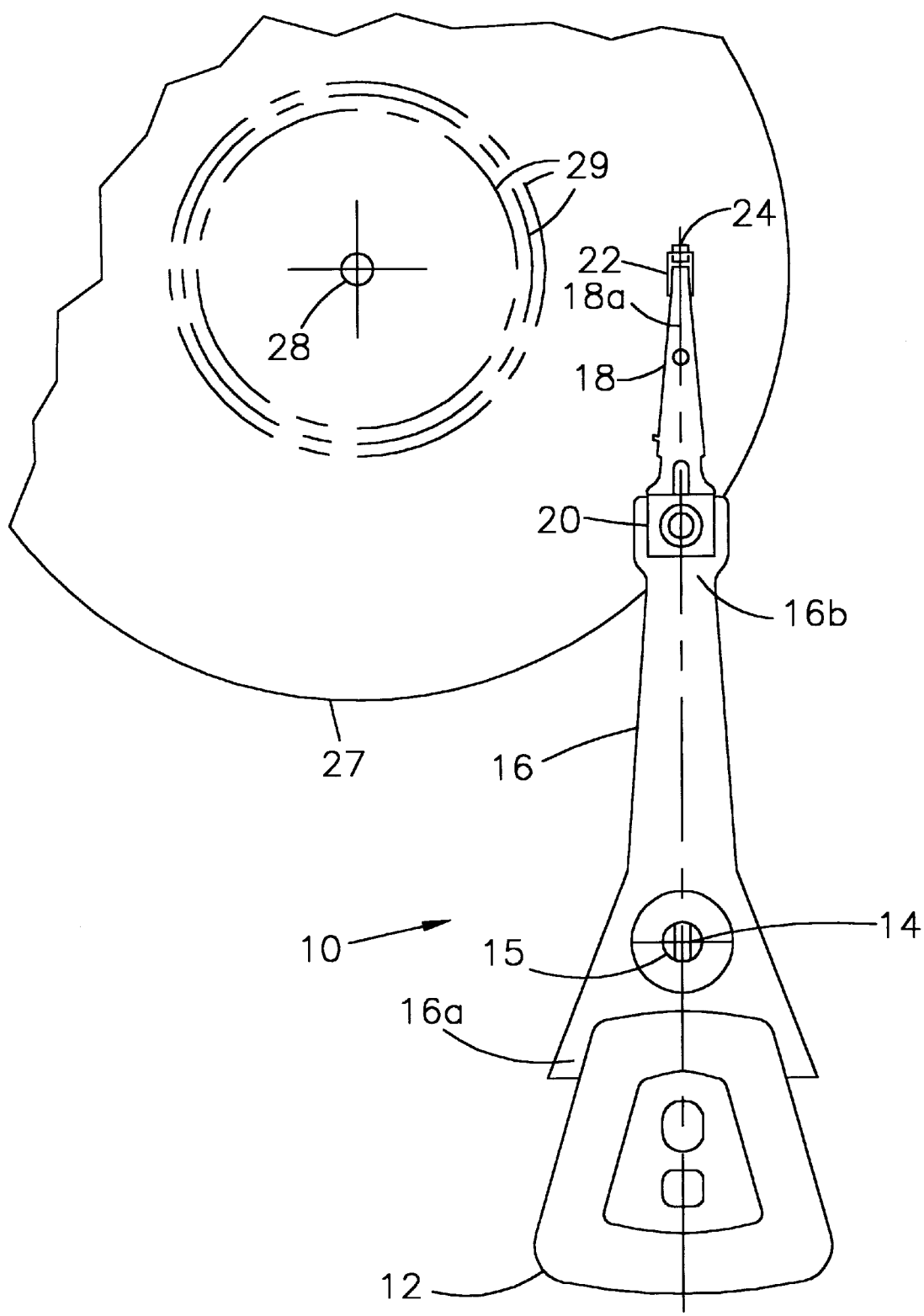
FIG. 1 is a plan view of a disc drive actuation system for positioning a slider over tracks of a disc, in accordance with the present invention.

Reference numerals refer to the same or equivalent parts of the present invention throughout the several figures of the drawings.

DETAILED DESCRIPTION OF THE INVENTION

FIG. 1 illustrates a disc drive actuation system 10 which comprises a voice coil motor (VCM) 12 mounted on a first end 16a of an actuator arm 16 mounted on a spindle 15 to rotate around an axis 14, and a head suspension 18 connected to a second end 16b of the actuator arm 16 at a head mounting block 20. A flexure 22 is mounted at an end 18a of the head suspension 18 away from the actuator arm 16 and carries a magnetic micro-actuator assembly containing a slider 24. The slider 24 is positioned over a disc 27, which is mounted to rotate about an axis 28. The disc 27 stores data on tracks 29. To read data from the tracks 29 of the disc 27 as the disc rotates around the axis 28, the voice coil motor 12 is operated to rotate the actuator arm 16 to position the magnetic micro-actuator assembly containing the slider 24 over the tracks 29. The voice coil motor 12, alone, lacks sufficient resolution and frequency response to position a transducing head 26 (FIG. 2) on the slider 24 precisely over a selected track 29 for reading from and writing to a disc 27. Therefore, development of a high resolution actuation device is necessary.

Figure 2:
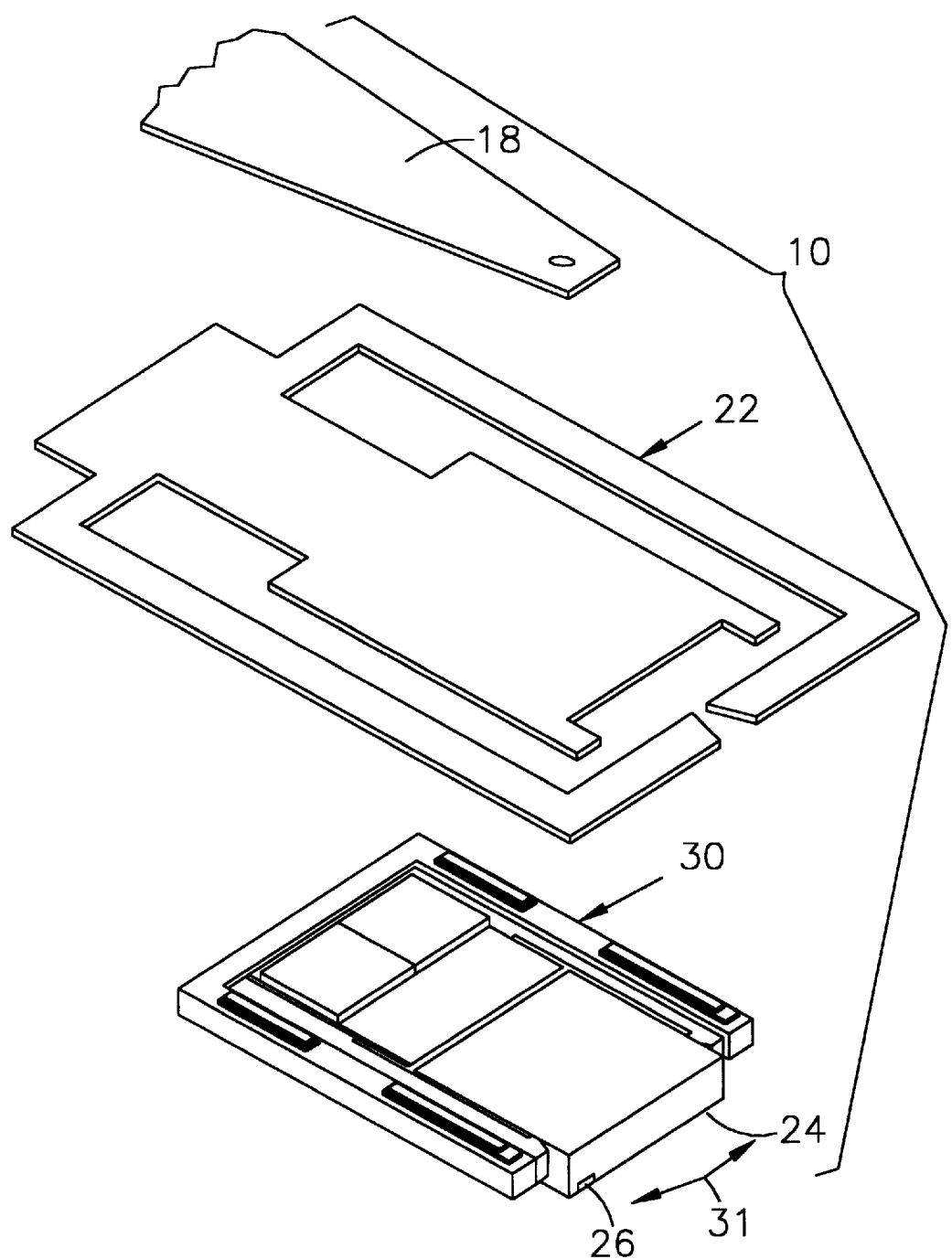
FIG. 2 is an exploded perspective view of a portion of a disc drive including a micro-actuator assembly, in accordance with the present invention.

FIG. 2 is an exploded perspective view of a portion of a disc drive actuation system 10 (FIG. 1) including a micro-actuator assembly 30 according to the present invention. The flexure 22 is attached to the head suspension 18, and the micro-actuator assembly 30 is attached to the flexure 22 to carry the slider 24 above a surface of the disc 27 (FIG. 1). A transducing head 26 is carried by the slider 24 and transduces data on the disc 27 (FIG. 1).

A. PREFERRED EMBODIMENT OF THE INVENTION

Figure 3:
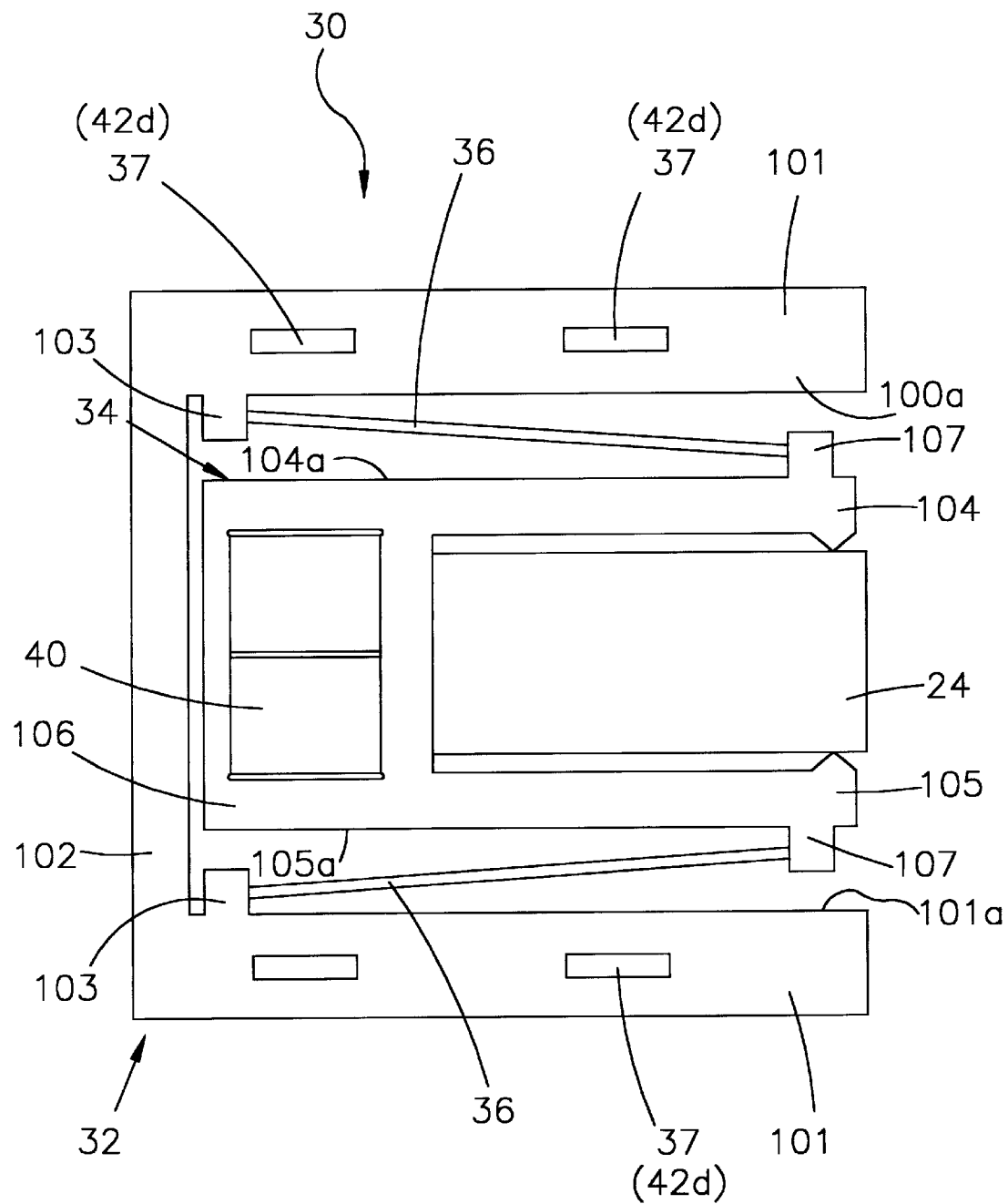
FIG. 3 is a plan view of the micro-actuator of a preferred embodiment, in accordance with the present invention.

FIG. 3 is a plan view of the micro-actuator assembly 30 of a preferred embodiment of the invention. The micro-actuator assembly 30 comprises a micro-actuator body 32, a slider body 34, and the slider 24. The micro-actuator body 32 has a general U-shape with a first arm 100 having an inner side 100a, a second arm 101 parallel and spaced apart from the first arm 100 having an inner side 101a, and a base 102 connected between the first arm 100 and the second arm 101. Micro-actuator body beam mounts 103 extend from inner sides 100a and 101a of the first arm 100 and second arm 101, respectively, of the micro-actuator body 32. The slider body 34 is placed inside the U-shape of the micro-actuator body 32 (FIG. 3). The slider body 34 also has a U-shape with a first clip arm 104 having an outer side 104a, a second clip arm 105 having an outer side 105a, and clip base 106 connected between the first clip arm 104 and the second clip arm 105. Slider body beam mounts 107 extend from the outer sides 104a and 105a of the first clip arm 104 and the second clip arm 105, respectively, of the slider body 34. At least one flexible beam 36 mechanically connects the micro-actuator body 32 to the slider body 34. The at least one flexible beam 36 extends from the micro-actuator body beam mounts 103 to the slider body beam mounts 107. A plurality of stand-offs 37 are mounted on the first arm 100 and second arm 101 of the micro-actuator body 32. A magnetic assembly 40 of at least one magnet 48 is supported by the clip base 106 of the slider body 34. The slider 24 is clipped between the first clip arm 104 and the second clip arm 105 of the slider body 34.

Figure 4:
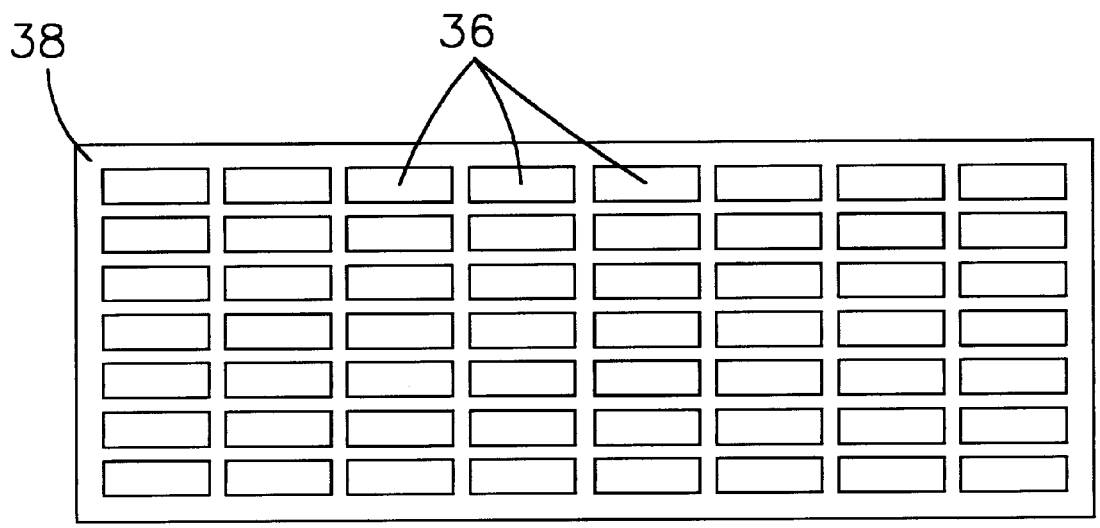
FIG. 4 is a plan view of a steel sheet from which a plurality of flexible beams are etched, in accordance with the present invention.
Figure 5:
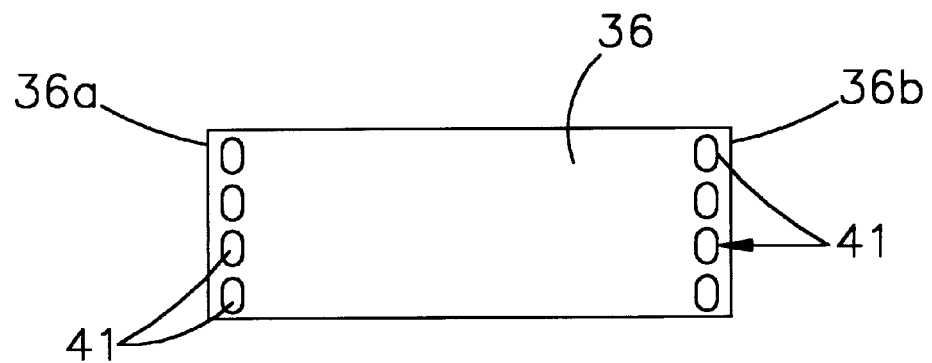
FIG. 5 is an enlarged top view of a flexible beam, in accordance with the present invention.
Figure 6:
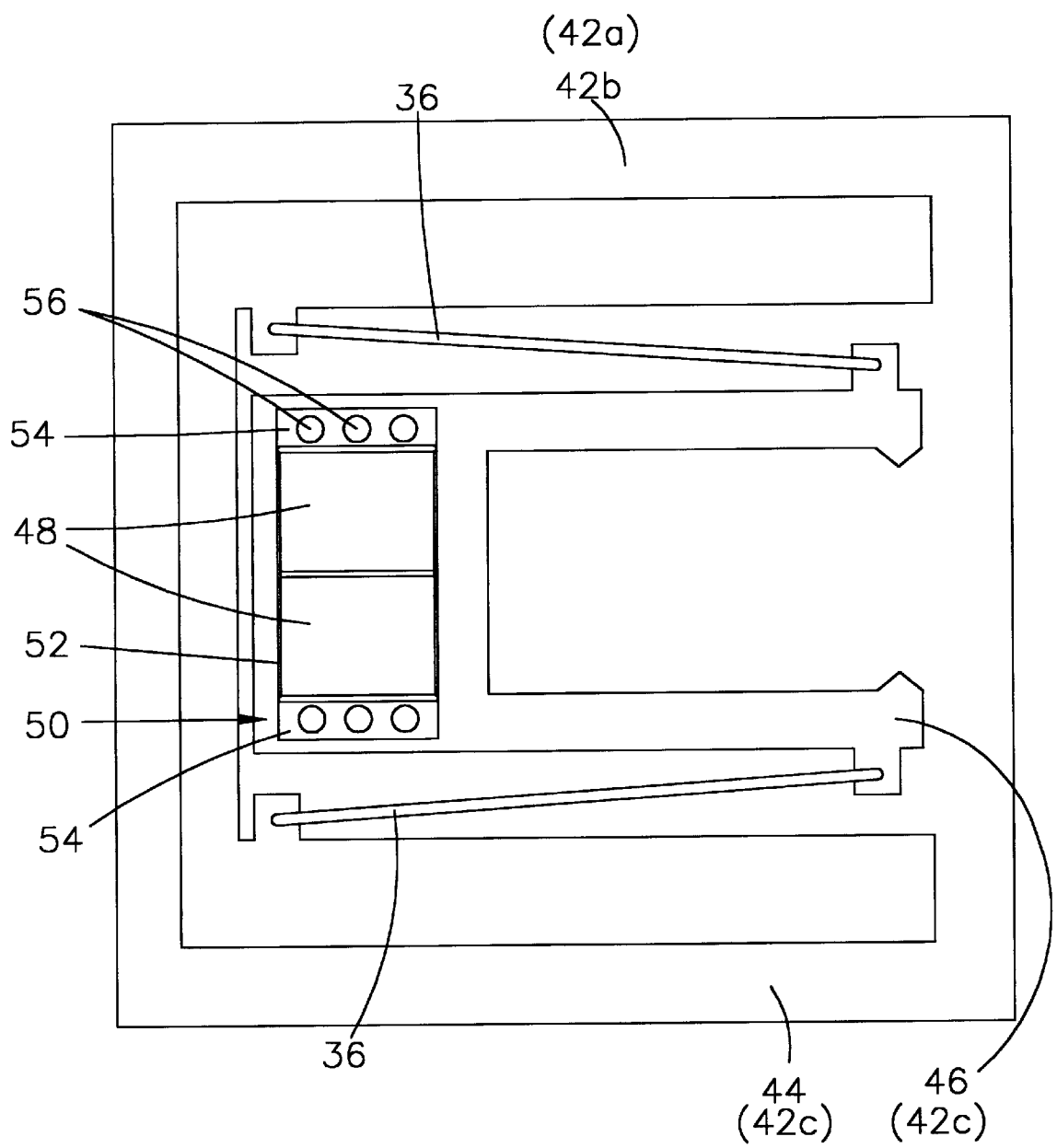
FIG. 6 is a top view of a bottom half of a mold used in fabricating the preferred embodiment of the invention, in accordance with the present invention.

The micro-actuator assembly 30 (FIG. 1) is fabricated in accordance with the process sequentially illustrated in FIGS. 4–6. FIG. 4 is a plan-form view showing the etching of at least one flexible beam 36 on a stainless steel sheet 38. FIG. 5 displays an enlarged top view of the at least one flexible beam 36 having a length with a first end 36a and a second end 36b. A plurality of flexible beam apertures 41 is placed at the first end 36a of the flexible beam 36 and at the second end 36b of the flexible beam 36.

FIG. 6 shows a plan-form view of at least one flexible beam 36 is placed in a bottom mold half 42b. A side view of the at least one flexible beams 36 placed between a first mold cavity 44 and a second mold cavity 46 is shown in FIG. 6. The first mold cavity 44 is shaped to form the micro-actuator body 32 (FIG. 6). The second mold cavity 46 is shaped to form the slider body 34 (FIG. 3). In the preferred embodiment, at least one magnet 48 is placed in a magnet keeper 50. The magnet keeper 50 comprises a magnet container 52 for holding the at least one magnet 48 and a pair of flanges 54. In the preferred embodiment, the magnet container 52 is, itself, made of a magnetic material. Each flange 54 has a plurality of flange apertures 56 for facilitating injection molding. The magnet keeper 50 is placed in the second mold cavity 46. A matching top mold half 42a (not shown in FIG. 6) is placed over the bottom mold half 42b. A liquid polymer 42c is injected into the mold 42 formed by the top mold half 42a and the bottom mold half 42b. As the liquid polymer 42c passes through the mold 42, some of the liquid polymer 42c passes through the flange apertures 56 in the flanges 54 of the magnet keeper 50 and some of the liquid polymer 42c passes through the plurality of flexible beam apertures 41 in the flexible beam 36. The liquid polymer 42c is hardened to form the micro-actuator body 32 and slider body 34 (FIG. 3). Cavities 42d (not shown) for the stand-offs 37 are formed into the top mold half 42a so that the stand-offs 37 may be formed during the injection-molding process. The slider 24 is slid into the slider body 34. The flexible beam apertures 41 in the flexible beam 36 and the flange apertures 56 in the magnet keeper 50 provide more surface area in all three dimensions for better bonding of the injection-molded micro-actuator body 32 and the injection-molded slider body 34 to the flexible beam 36 as well as for better bonding of the injection-molded slider body 34 to the magnet keeper 50.

Figure 7:
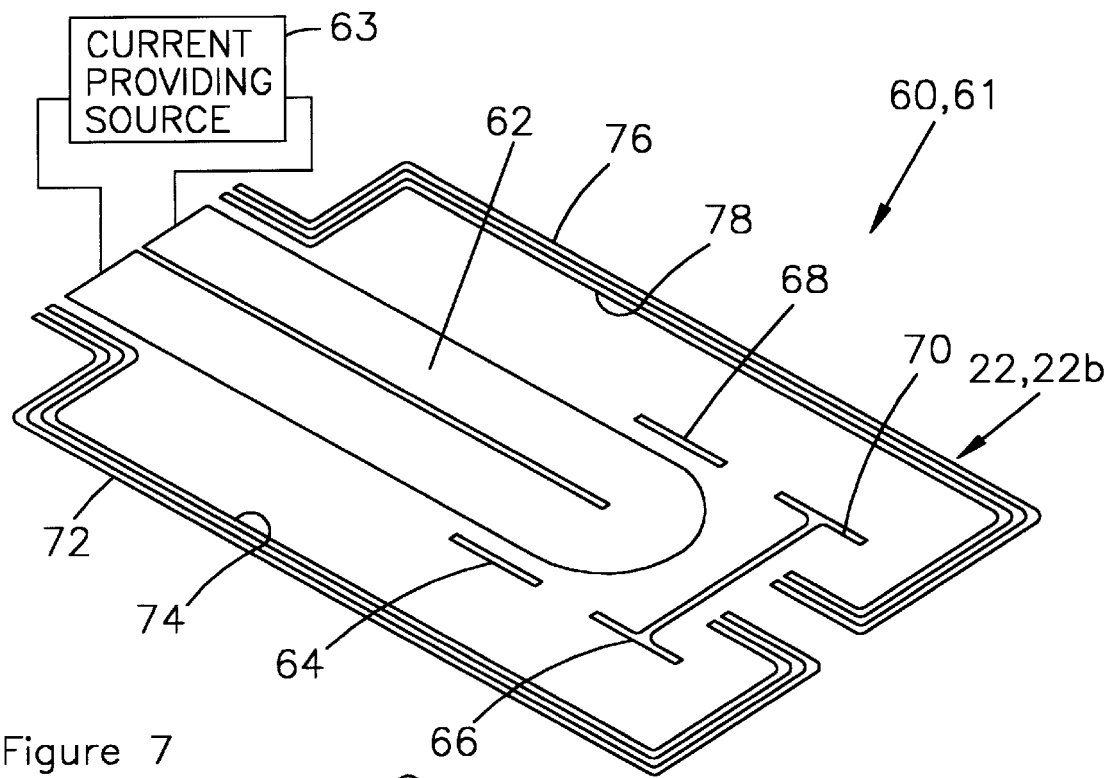
FIG. 7 is a perspective view of the underside of a flexure, in accordance with the present invention.

FIG. 7 is a perspective view of an underside 22b of the flexure 22. The flexure 22 is formed from a non-conductive polyimide material such as Kapton™ and forms the substrate 60 of a flex circuit 61, which comprises a conductive coil 62 connected to a current-providing source 63, and stand-offs 64, 66, 68, and 70. The stand-offs 64, 66, 68, and 70 are aligned with the stand-offs 37 on the micro-actuator body 32 to apply a pre-load force to the micro-actuator 30 as it carries the slider 24 (FIG. 3). In addition, conductive data leads 72, 74, 76, and 78 are provided to electrically contact the transducing head 26 carried by the slider 24. The conductive coil 62 and conductive data leads 72, 74, 76, and 78 are formed from a conductive material such as copper. The stand-offs 64, 66, 68, and 70 may be also formed from copper. The total spacing between the at least one magnet 48 and the conductive coil 62 is typically about 10 to 100 microns ($\mu$m). The flexure 22 may be about 50 microns thick. The conductive coil 62 is typically about 20 microns thick.

Figure 8:
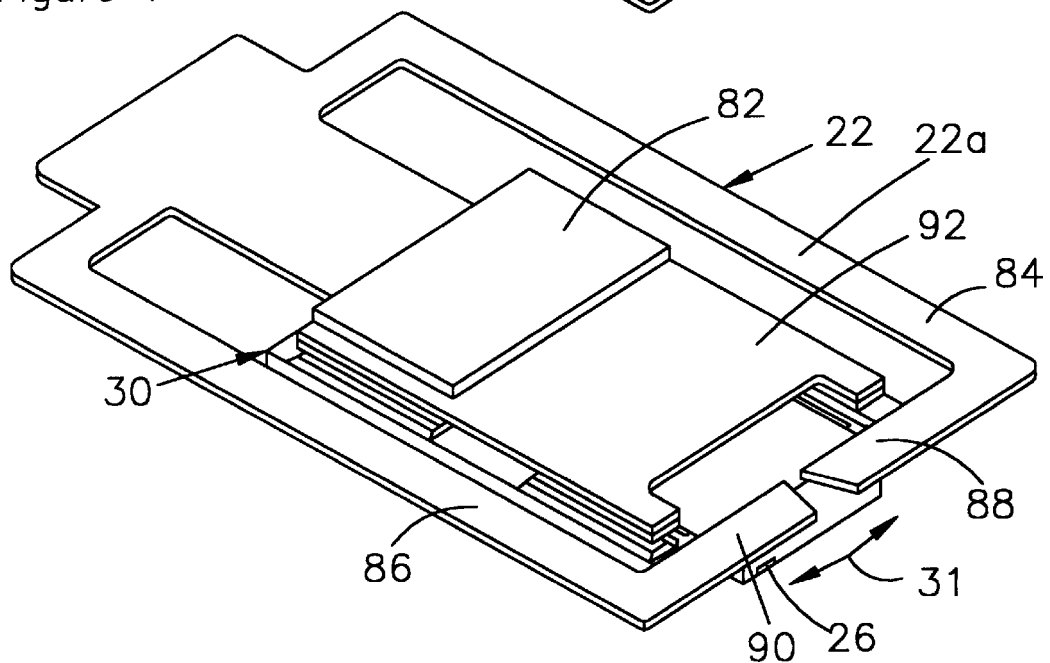
FIG. 8 is a perspective view of the micro-actuator attached to the underside of the flexure for use in a disc drive, in accordance with the present invention.

FIG. 8 is a perspective view of the micro-actuator assembly 30 attached to the underside 22b of the flexure 22 for use in a disc drive. The flexure 22 includes a ferromagnetic keeper 82 formed on a top surface 22a of the flexure 22 opposite from the conductive coil 62 and above the at least one magnet 48 of the micro-actuator assembly 30.

Figure 9:
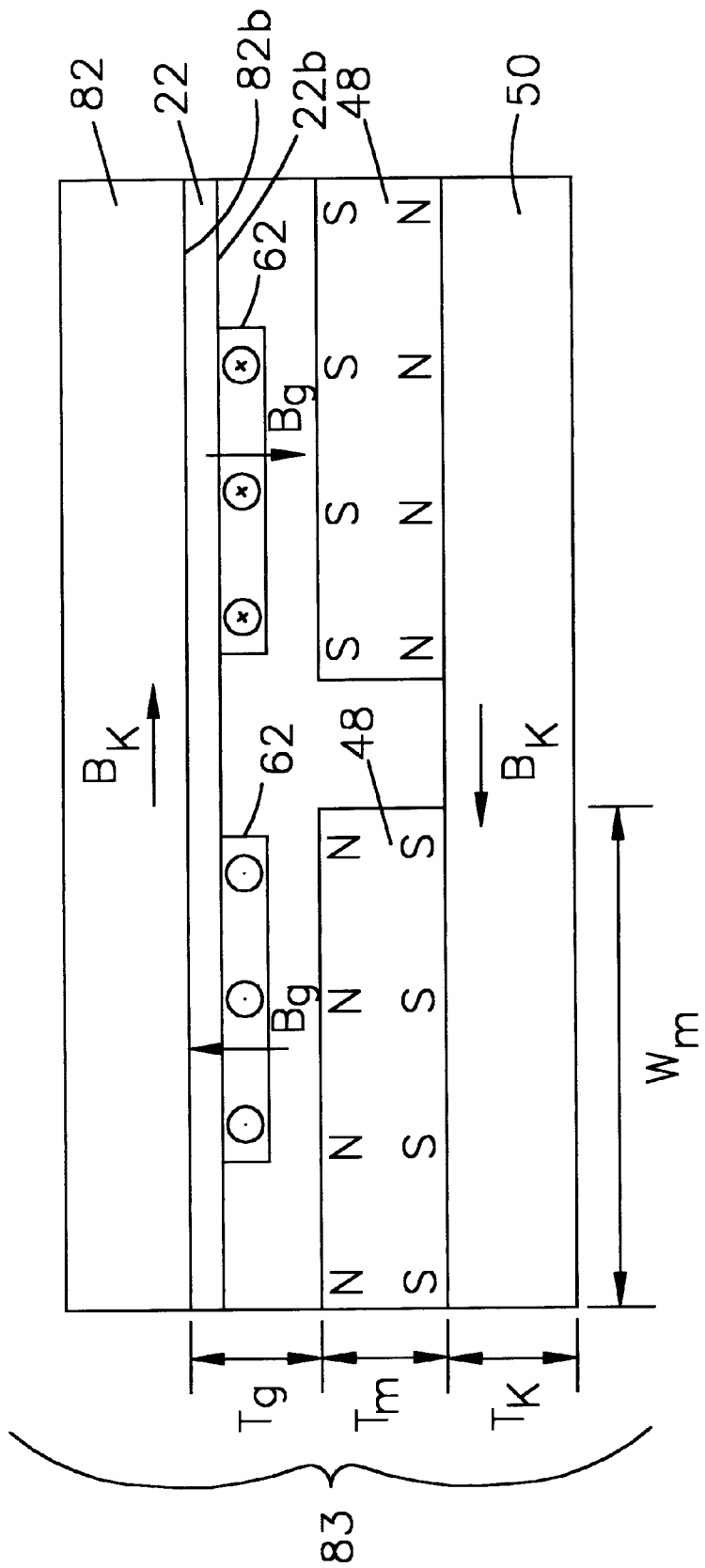
FIG. 9 is a schematic view of a vertically arranged magnetic circuit between the flexure and the micro-actuator, in accordance with the present invention.

This vertically arranged magnetic circuit 83 is formed from the magnet keeper 50, the at least one magnet 48, the conductive coil 62, and the ferromagnetic keeper 82 as shown schematically in FIG. 9. A current flowing through the conductive coil 62 interacts with the magnetic field in the air gap between the at least one magnet 48 and the ferromagnetic keeper 82, wherein the magnetic flux is oriented in the direction indicated by the arrows in FIG. 9: $B_g$=flux in the air gap, $B_k$=flux in the keepers, and $B_m$=flux in the magnets. This interaction causes a force to be exerted on the at least one magnet 48 in a lateral direction (i.e. across the tracks 29 of the disc 27), such force being controllable to achieve high resolution movement for fine positioning of the slider 24 with respect to the tracks 29 of the disc 27. The ferromagnetic keeper 82 may be plated on the polyimide substrate 60 of the flexure 22 or may be thereto adhesively bonded.

The flexure 22 is shaped to include arms 84 and 86 and cross beams 88 and 90 for supporting the conductive data leads 72, 74, 76, and 78, and a central portion 92 for supporting the conductive coil 62 and the stand-offs 64, 66, 68, and 70 (FIGS. 7 and 8). Pre-load force is applied to the central portion 92 of the flexure 22 by the head suspension 18 (FIG. 2). The arrangement of the flexure 22 and the design of the micro-actuator 30 are such that the operation of the micro-actuator 30 by circulating current through the conductive coil 62 results in cross-track movement of the slider 24 in a horizontal plane generally parallel to the surface of the disc 27 in the directions of arrows 31 (FIGS. 2 and 8), with movement being permitted by the flexible beam 36 (FIGS. 3 and 6). The micro-actuator body 32 forms the stator of the motor. The at least one magnet 48 and the slider body 34 form the rotor of the motor to provide movement to the slider 24. Thus, the lateral movement of the at least one magnet 48 affects the cross-track (horizontal) position of the slider 24 with respect to the micro-actuator body 32, and also with respect to the flexure 22 and to the tracks 29 of the disc 27. An adhesive between the stand-offs 64, 66, 68, and 70 of the flexure 22 and the stand-offs 37 of the micro-actuator body 32 is used to connect or mount the micro-actuator body 32 to the flexure 22.

B. EXAMPLES OF ADDITIONAL EMBODIMENTS OF THE INVENTION

Example 1

The liquid polymer 42 used for injection-molding in the foregoing preferred embodiment may, instead be a liquid metal 97.

Example 2

A ceramic insert 98a or an injection-molded polymer insert 98b may be utilized instead of the metal insert flexible beam 36 of the preferred embodiment.

Example 3

Additives, having a matching coefficient of expansion to the head suspension 18 and to the ferromagnetic keeper 82, may be included in the base injection-molding material 42c of the preferred embodiment for improving adhesion.

Example 4

The ferromagnetic keeper 82 may be located on the underside 22b of the flexure 22, with an additional insulating layer on a bottom surface 82b of the ferromagnetic keeper 82 for insulating the ferromagnetic keeper 82 from the conductive coil 62.

Example 5

A gimbal assembly may be added to the injection molding step of the preferred embodiment.

Information as herein shown and described in detail is fully capable of attaining the above-described object of the invention, the presently preferred embodiment of the present invention, and is, thus, representative of the subject matter which is broadly contemplated by the present invention. The scope of the present invention fully encompasses other embodiments which may become obvious to those skilled in the art, and is to be limited, accordingly, by nothing other than the appended claims, wherein reference to an element in the singular is not intended to mean "one and only one" unless explicitly so stated, but rather "one or more." All structural and functional equivalents to the elements of the above-described preferred embodiment and additional embodiments that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed:

1. A disc drive actuation system, having an actuator arm, a head suspension, and a flexure, the improvement, comprising:
   a. a means for providing an injection-molded magnetic micro-actuator assembly containing at least one magnet and a slider; and
   b. at least one flexible beam, wherein the at least one magnet and the at least one flexible beam are embedded in the injection-molded magnetic micro-actuator assembly, and wherein the at least one magnet is operatively coupled to the slider.

2. The system, as recited in claim 1, wherein the means for providing an injection-molded magnetic micro-actuator assembly comprises:
   a. a micro-actuator body of an injection-molded material,
   b. a slider body of an injection molded material
   c. a magnet keeper connected to the slider body, wherein the magnet keeper has at least one flange, each flange of the at least one flange having at least one aperture filled with the injection-molded material of the slider body, the at least one magnet mechanically connected to the slider body,
   d. a flexible connection between the micro-actuator body and the slider body, and the slider mechanically connected to the slider body.

3. The system, as recited in claim 2, wherein a magnet keeper is located on an underside of the flexure.

4. The system, as recited in claim 2,
   wherein the flexible connection between the micro-actuator body and the slider body comprises at least one flexible beam, each of the at least one flexible beam having a first end and a second end, wherein the first end of the at least one flexible beam has at least one aperture filled with the injection molded material of the micro-actuator body, and wherein the second end of the at least one flexible beam has at least one aperture filled with injection molded material of the slider body.

5. A method for manufacturing a disc drive actuation system, comprising the steps of:

a. providing a mold having a first cavity for forming a micro-actuator body and a second cavity for forming a slider body;

b. placing at least one magnet in a magnet keeper;

c. placing the magnet keeper in the second cavity of the mold;

d. providing at least one flexible beam, each of the at least one flexible beam having two ends;

e. placing the at least one flexible beam in the mold;

f. filling the mold with a fluid;

g. solidifying the fluid, thereby forming a solidified fluid comprising the micro-actuator body and the slider body;

h. removing the micro-actuator body and the slider body from the mold;

i. inserting a slider into the slider body, thereby forming a magnetic micro-actuator assembly;

j. providing a disc drive assembly; and k. installing the magnetic micro-actuator assembly into the disc drive assembly.

6. The method, as recited in claim 5, wherein an actuator arm having a first end and a second end is positioned on a spindle at the first end, wherein a conductive coil is mounted on the first end of the actuator arm, wherein a head suspension is connected to the second end of the actuator arm at a head mounting block, wherein a flexure is mounted at an end of the head suspension away from the actuator arm, and wherein the flexure carries the magnetic micro-actuator assembly, and thereby precisely positions a transducing head over a selected track of a disc.

7. The method, as recited in claim 6, wherein the at least one flexible beam is placed in the mold between the first cavity and the second cavity.

8. The method, as recited in claim 6, wherein the at least one aperture is located at each of the two ends of each at least one flexible beam, and wherein the fluid passes through the at least one aperture during the step (f) of filling the mold.

9. The method, as recited in claim 6, wherein the at least one flexible beam is formed from a material selected from a group of materials consisting of a sheet stainless steel and a bulk ceramic.

10. The method, as recited in claim 6, wherein the fluid is selected from a group of materials consisting essentially of a liquid polymer and a liquid metal.

11. The method, as recited in claim 6, wherein a coefficient of expansion of the solidified fluid matches both a coefficient of expansion of the head suspension and a coefficient of expansion of the magnet keeper.

12. The method, as recited in claim 5, wherein the first cavity for forming the micro-actuator body has a plurality of sub-cavities for forming a plurality of offsets on the micro-actuator body.

13. The method, as recited in claim 5, wherein the first cavity has a U-shape for forming a U-shaped micro-actuator body having a first arm, a second arm, and a base connected between the first arm and the second arm, wherein the second cavity has a U-shape for forming a U-shaped slider body having a first clip arm, a second clip arm, and a clip base connected between the first clip arm and the second clip arm, and wherein the magnet keeper is located in the clip base of the slider body and the slider is inserted between the first clip arm and the second clip arm.

14. The method, as recited in claim 5, wherein the magnet keeper has at least one flange extending from the magnet keeper, wherein the at least one flange has at least one aperture, and wherein the fluid passes through the at least one aperture during the step of filling the mold.

15. The method, as recited in claim 5, wherein the at least one flexible beam is placed in the mold between the first cavity and the second cavity.

16. The method, as recited in claim 5, wherein the at least one aperture is located at each of the two ends of each at least one flexible beam, and wherein the fluid passes through the at least one aperture during the step (f) of filling the mold.

17. The method, as recited in claim 5, wherein the at least one flexible beam is formed from a material selected from a group of materials consisting of a sheet stainless steel and a bulk ceramic.

18. The method, as recited in claim 5, wherein the fluid is selected from a group of materials consisting essentially of a liquid polymer and a liquid metal.

19. The method, as recited in claim 5, wherein a coefficient of expansion of the solidified fluid matches both a coefficient of expansion of the head suspension and a coefficient of expansion of the magnet keeper.

20. The method, as recited in claim 5, further comprising the step of placing a gimbal assembly in the mold between the first cavity and the second cavity after said step (e) and before said step (f).

* * * * *